(12) United States Patent
Arai et al.

(10) Patent No.: US 6,507,398 B1
(45) Date of Patent: Jan. 14, 2003

(54) CZERNY-TURNER SPECTROSCOPE

(75) Inventors: Akihiro Arai, Kyoto-fu (JP); Yoshihisa Harada, Shiga-ken (JP); Ryo Tateno, Kyoto-fu (JP)

(73) Assignee: Shimadzu Corporation, Kyoto (JP)

( * ) Notice: Subject to any disclaimer, the term of this patent is extended or adjusted under 35 U.S.C. 154(b) by 245 days.

(21) Appl. No.: 09/703,795

(22) Filed: Nov. 2, 2000

(30) Foreign Application Priority Data

Nov. 5, 1999 (JP) ............................................ 11-314725

(51) Int. Cl.[7] .................................................. G01J 3/18
(52) U.S. Cl. ..................................................... 356/328
(58) Field of Search ............................... 356/328, 315, 356/316, 318, 334, 326, 320, 319

(56) References Cited

U.S. PATENT DOCUMENTS 4,975,919 A * 12/1990 Amada et al. ................. 372/32
5,497,230 A * 3/1996 Ohkubo et al. .............. 600/112

FOREIGN PATENT DOCUMENTS

| EP | 1099942 A1 | * | 5/2001 | ............. G01J/3/18 |
| JP | 357037222 A | * | 3/1982 | ............. G01J/3/06 |
| JP | 405203492 | * | 8/1993 | ............. G01J/3/18 |

* cited by examiner

Primary Examiner—Karl D Frech
(74) Attorney, Agent, or Firm—Armstrong, Westerman & Hattori, LLP

(57) ABSTRACT

A Czerny-Turner spectroscope according to the present invention includes: a collimator mirror having a toroidal surface for reflecting a beam of light passing through an entrance slit to a plane diffraction grating; and a telemeter mirror having a cylindrical surface for reflecting and converging the beam of light reflected and separated by the plane diffraction grating to an exit. When a slit is placed at the exit, the straight generatrix is set substantially parallel to the exit slit. When a linear object (such as the separation channel of the capillary electrophoresis microchip) to receive a part of the spectrum of light reflected by the telemeter is placed at the exit, the linear object is set parallel to the straight generatrix. By this construction and configuration, the curving of monochromatic spectrum component at the exit is minimized, and the monochromatic light produced by the inventive Czerny-Turner spectroscope can pass the exit slit in full. Thus, when used, as the detector of a capillary electrophoresis microchip, stability and reproducibility of capillary electrophoresis measurements are achieved.

8 Claims, 4 Drawing Sheets

λ = 190 nm

λ = 250 nm

λ = 370 nm

λ = 190 nm

λ = 250 nm

λ = 370 nm

CZERNY-TURNER SPECTROSCOPE

The present invention relates to a Czerny-Turner spectroscope, and especially to its optical system. Such a spectroscope is used, for example, in an ultraviolet and visible spectrophotometer or other spectrophotometers.

BACKGROUND OF THE INVENTION

Capillary electrophoresis (CE) is an analyzing method suited for analyzing peptides, proteins, nucleic acids, sugars or other biological substances. It is also suited for use in an optical resolution, isotropic separation or other separation of very close substances at high speed. Thus it is used in clinical diagnoses or in monitoring of various medicines and environmental substances.

However, the capillary has a small outer diameter of about 100 to 400 micrometers, and is fragile even though it is usually protected by a polyimide coating. Therefore, the user must be extremely careful during the process of exchanging it. Furthermore, an accurately measured injection of sample into a capillary is difficult, and on-capillary reaction schemes usually require junctions which are difficult or tedious to make without introducing an extra volume. These have led to the proposal of a capillary electrophoretic chip (referred to as a microchip in this application) formed by connecting two substrates to each other, as described in Anal. Chim. Acta 283(1993), pp.361–366 by D. J. Harrison et al.

FIG. 5 is a perspective view of an exemplary microchip 10 used in such a system. The microchip 10 is composed of a pair of transparent plates (glass plates, quartz plates, or plastic plates) 11, 12 attached together. On the top face of the lower plate 11 are formed two crossing grooves, one for a sample loading channel 13 and the other for a separation channel 14. In the upper plate 12 are formed four through holes respectively located at both ends of the channels 13 and 14, which are used for reservoirs R1, R2, R3 and R4. The channels 13 and 14 are formed by etching the transparent plate 11 (or by any other method), with the width of generally 10–100 micrometers and the depth of generally 5–50 micrometers.

The measurement is performed as follows. First, media liquid is poured from any one of the reservoirs R1–R4 to fill the channels 13 and 14. Then, a small quantity of liquid sample is injected into one of the reservoirs R1 and R2 at an end of the sample loading channel 13, and a high voltage is applied between a pair of electrodes respectively put in the reservoirs R1 and R2. The liquid sample disperses along the sample loading channel 13. Then, another pair of electrodes is put respectively in the two reservoirs R3 and R4 at the ends of the separation channel 14, and a migration voltage is applied between the pair of electrodes. The sample at the crossing of the channels 13 and 14 migrates in the separation channel 14.

FIG. 6 shows a cross sectional view of the microchip 10 cut along the separation channel 14. An ultraviolet and visible spectrophotometer is placed at the end of the separation channel 14 as the detector. The detector is composed of a spectroscope 30 and a photo detector 31 placed across a near end part of the separation channel 14. Light from a lamp (not shown) is introduced into the spectroscope 30, where a monochromatic light of a certain wavelength is extracted and is cast onto the sample migrating in the separation channel 14. The transmitted light (or the reflected light) is received by the photo detector 31 and the strength is measured. Absorbance of the monochromatic light is calculated based on the measured strength and a component or components of the sample are identified.

A Czerny-Turner spectroscope is often used as the spectroscope 30 for a CE. A Czerny-Turner spectroscope includes: a plane diffraction grating; a first concave mirror (collimator mirror) for reflecting the light from the entrance slit to the plane diffraction grating; and a second concave mirror (telemeter mirror) for reflecting the light reflected and separated by the plane diffraction grating to the exit slit. As the plane diffraction grating is rotated about an axis passing through the center of its surface, the wavelength of light passing through the exit slit varies, whereby a wavelength scanning is performed.

In a conventional Czerny-Turner spectroscope, both the collimator mirror and the telemeter mirror have spherical surfaces. With such an optical construction, the shape of a monochromatic light (or a monochromatic component of the spectrum) P obtained from the spectroscope is not straight but curved, as shown in FIG. 7. Thus, the monochromatic spectrum component of a desired wavelength P only partly covers the separation channel 14. In the other part of the separation channel 14, the wavelength of light passing through the separation channel 14 deviates from the desired wavelength, which deteriorates the accuracy of measurement.

An object of the present invention is, therefore, to provide a spectroscope that can produce monochromatic spectrum components of a less-curved or straight form.

The inventors discovered using aspheric (non-spherical) surfaces for the collimator mirror and the telemeter mirror. Through intensive experiments and analyses, we invented a proper construction and configuration of the surfaces of the mirrors. Then, a Czerny-Turner spectroscope according to the present invention includes: a collimator mirror having a toroidal surface for reflecting a beam of light passing through an entrance slit to a plane diffraction grating; and a telemeter mirror having a cylindrical surface for reflecting and converging the beam of light reflected and separated by the plane diffraction grating to an exit.

When a linear spectrum restrictor is placed at the exit, the straight generatrix of the cylindrical surface of the telemeter mirror is set to lie substantially parallel to the linear spectrum restrictor. That means, when a slit is placed at the exit, the straight generatrix is set substantially parallel to the exit slit. When a linear object, such as the separation channel of the microchip, to receive a part of the spectrum of light reflected by the telemeter is placed at the exit, the linear object is set parallel to the straight generatrix.

The above cited Czerny-Turner spectroscope is used in a broader sense which includes a crossed-type Czerny-Turner spectroscope in which the incident beam and the reflected beam of the plane diffraction grating cross and a Czerny-Turner spectroscope in a narrower sense in which they do not cross.

According to the present invention, the curving of monochromatic spectrum component at the exit is minimized. When a linear spectrum restrictor is placed at the exit, the monochromatic light produced by the inventive Czerny-Turner spectroscope can enter the linear spectrum restrictor in full. Thus, when used, for example, as the detector of a microchip electrophoresis system, stability and reproducibility of capillary electrophoresis measurements are achieved. The inventive Czerny-Turner spectroscope can also be used in a spectrophotometer for general analyzers, whereby the accuracy and reliability of the measurements are improved.

BRIEF DESCRIPTION OF THE ATTACHED DRAWINGS

DETAILED DESCRIPTION OF AN EMBODIMENT

Figure 1:
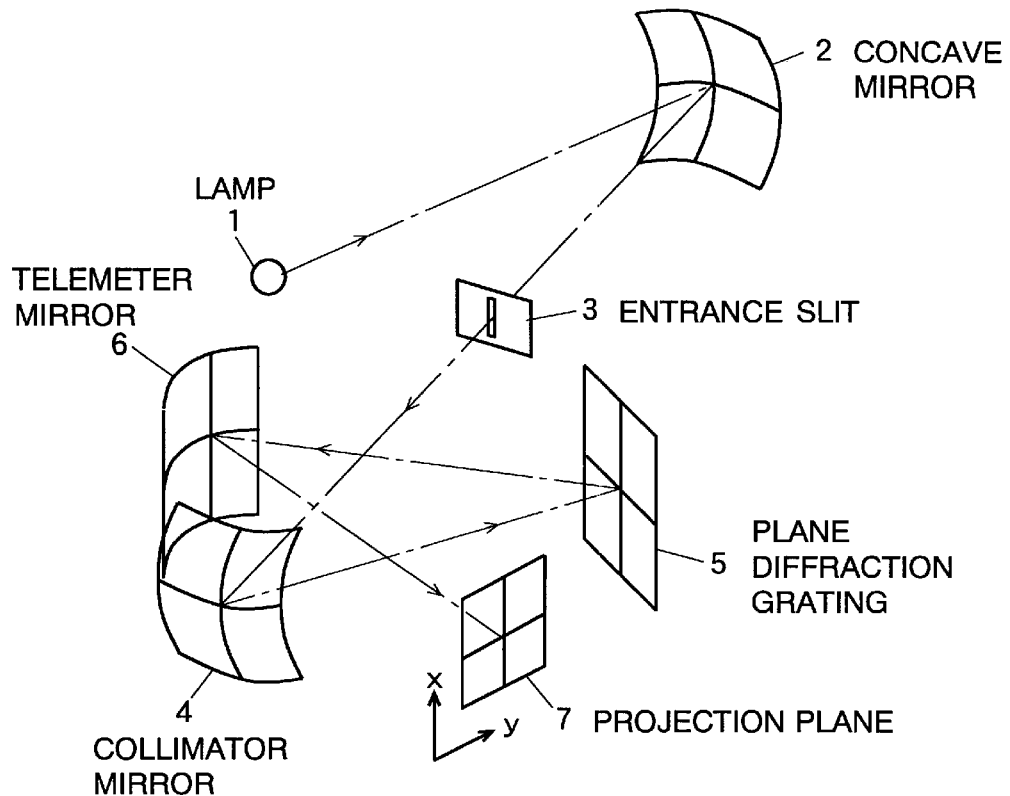
FIG. 1 is a perspective view of the optical system of a crossed-type Czerny-Turner spectroscope embodying the present invention.

A crossed-type Czerny-Turner spectroscope embodying the present invention is described. FIG. 1 is a perspective view of the optical system of the spectroscope. Light from a lamp 1 is converged by a first concave mirror 2 and is cast on an entrance slit 3. The beam of light passing through the entrance slit 3 is reflected and collimated by a collimator mirror 4, which is sent to a plane diffraction grating 5. When the light is reflected by the plane diffraction grating 5, the light is separated by the wavelength. The separated light is converged by a telemeter mirror 6 and is cast onto a projection plane 7. When the vertical axis in the projection plane 7 is defined as x-axis and the horizontal axis is defined as y-axis, the entrance slit 3 lies vertical along the x-axis.

In the present embodiment, the first concave mirror 2 and the collimator mirror 4 have toroidal surfaces, and the telemeter mirror 6 has a cylindrical surface. A toroidal mirror is a concave mirror having different curvatures in one axis (the vertical axis or x-axis in FIG. 1) and in the perpendicular axis (the horizontal axis or y-axis in FIG. 1). A cylindrical mirror is a concave mirror having a curvature in the one axis (the horizontal axis or y-axis in FIG. 1) and no curvature (or straight) in the perpendicular axis (the vertical axis or x-axis in FIG. 1).

When an exit slit is provided to extract a monochromatic light from the light reflected and converged by the telemeter mirror 6, the exit slit is set vertical (or to lie along x-axis). When an ultraviolet and visible spectrophotometer including such a spectroscope described above is used for a capillary electrophoresis microchip, the microchip is positioned so that the separation channel 14 extends along x-axis of the spectroscope. The projection plane 7 is set to coincide with the detection plane of the photo detector 31.

Figure 2:
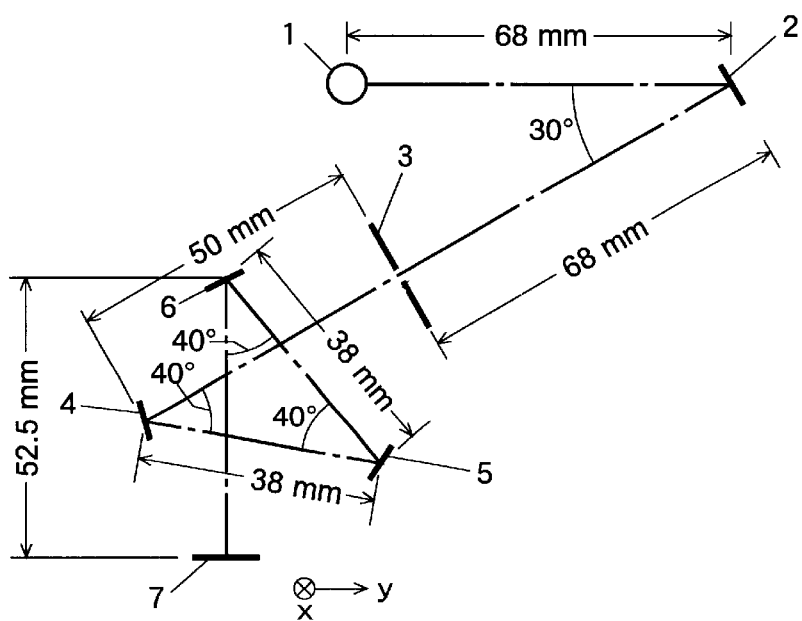
FIG. 2 is a plan chart of the optical system.

FIG. 2 shows an example of a concrete configuration chart of the optical system, which is a plan view of the optical system. The elements of the optical system is placed according to the distances and angles designated by the configuration chart. The properties of the elements are given below.

Figure 3A:
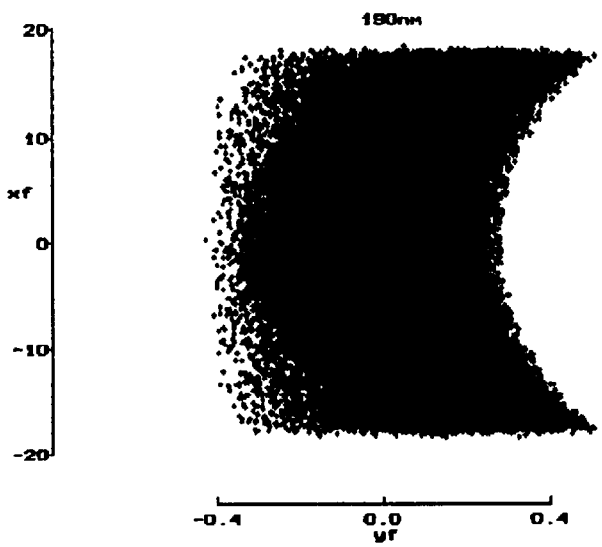
FIGS. 3A–3C are spot diagrams on the projection plane according to an inventive Czerny-Turner spectroscope.
Figure 3B:
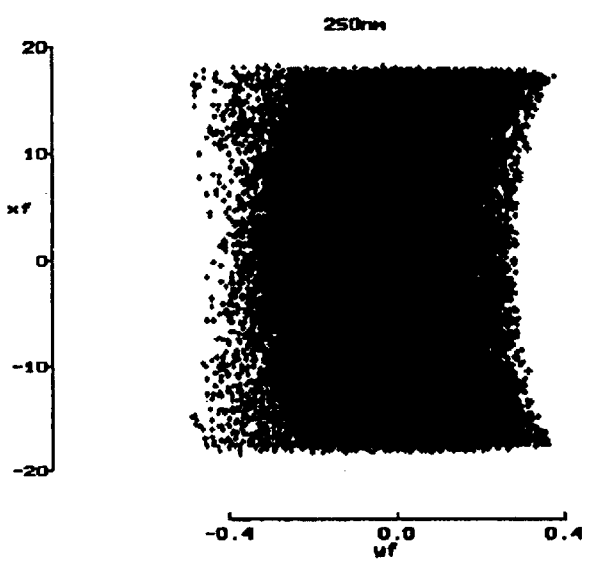
Figure 3C:
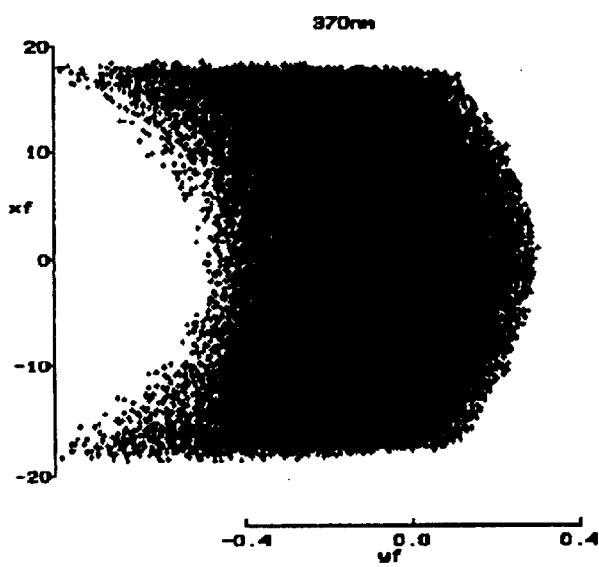
Figure 4A:
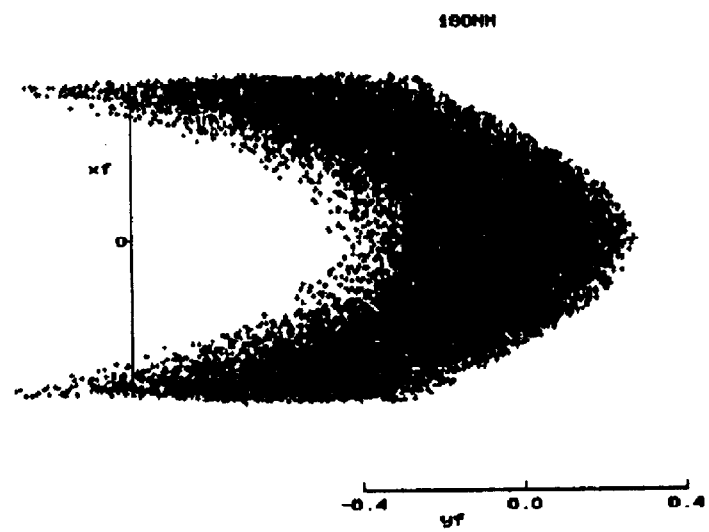
FIGS. 4A–4C are spot diagrams on the projection plane according to a conventional Czerny-Turner spectroscope.
Figure 4B:
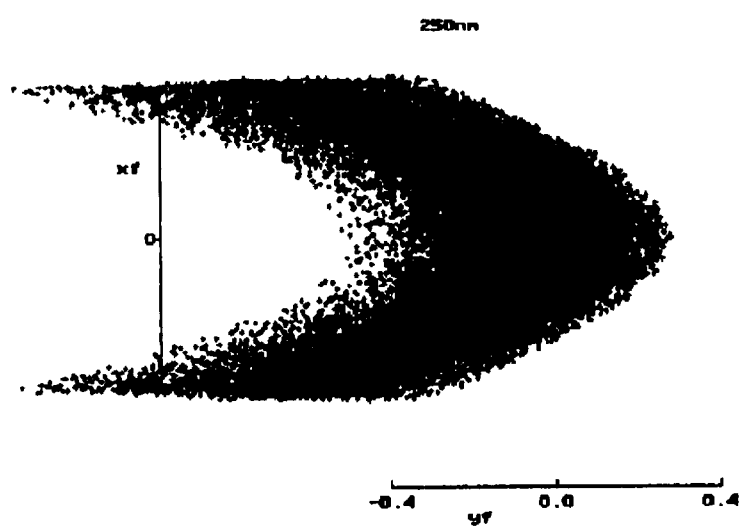
Figure 4C:
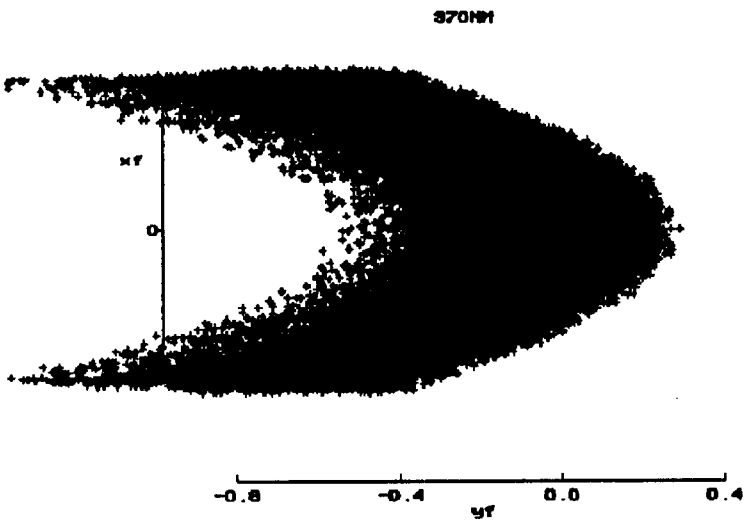
Figure 5:
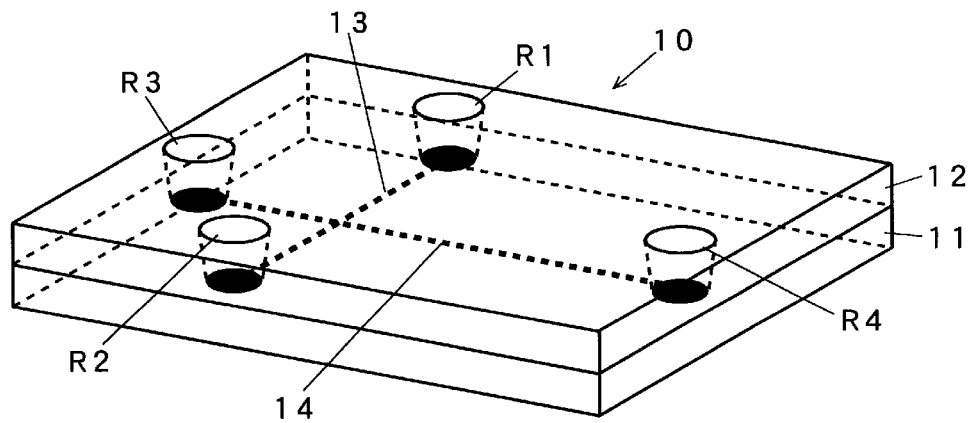
FIG. 5 is a perspective view of a capillary electrophoresis microchip.
Figure 6:
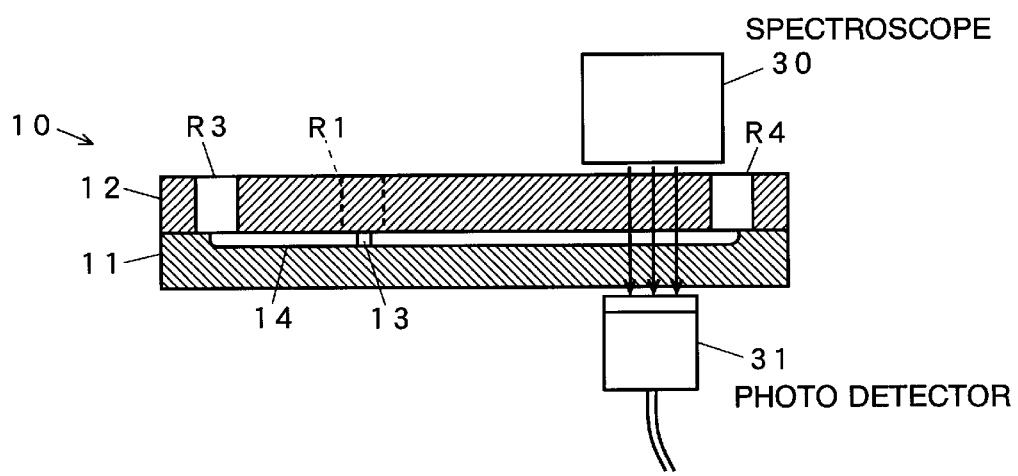
FIG. 6 is a cross-sectional view of the capillary electrophoresis microchip cut along the separation channel.
Figure 7:
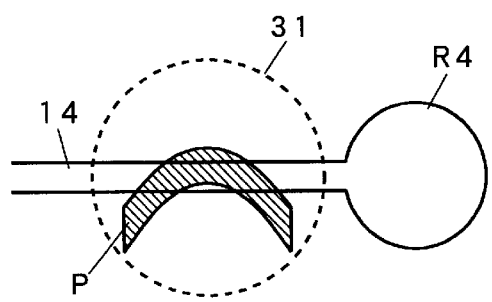
FIG. 7 is a diagram of a curved monochromatic spectrum component and the separation channel.

(1) Lamp 1
   Dimension: Diameter 0.5 mmφ
(2) Concave mirror 2
   Dimensions: 30×60 mm
   Surface: Toroidal
     Radii of curvature
       Meridional plane: 70.8 mm
       Sagittal plane: 66.1 mm
(3) Collimator mirror 4
   Dimensions: 20×40 mm
   Surface: Toroidal
     Radii of curvature
       Meridional plane: 107.0 mm
       Sagittal plane: 54.9 mm
(4) Telemeter mirror 6
   Dimensions: 20×20 mm
   Surface: Cylindrical
     Radii of curvature
       Meridional plane: 111.739 mm
       Sagittal plane: ∞
(5) Plane diffraction grating 5
   Dimensions: 20×30 mm
   Grating constant N: 900 lines/mm
   Brazed wavelength: 250 nm A series of computer simulations are performed based on the configuration shown in FIG. 2 and data given in the above table, and spot diagrams on the projection plane 7 are obtained as shown in FIGS. 3A–3C. For comparison, similar computer simulations are performed on a conventional spectroscope using spherical collimator mirror and spherical telemeter mirror, the result of which is shown in FIGS. 4A–4C. FIGS. 3A and 4A are for the case where the rotational position of the plane diffraction grating 5 is adjusted to produce a monochromatic light of 190 nm wavelength; FIGS. 3B and 4B are for 250 nm wavelength; and FIGS. 3C and 4C are for 370 nm wavelength. In FIGS. 3A–4C, the vertical axis is x-axis and the horizontal axis is y-axis.

As shown in FIGS. 4A–4C, the monochromatic spectrum component is significantly curved in any of the wavelengths. When the wavelength of the monochromatic light extracted from the spectroscope is shifted from, for example, 190 nm, the monochromatic spectrum component shown in FIG. 4A moves in the y-axis keeping its shape. In this case, supposing that the separation channel 14 lies along x-axis, only a part of the separation channel 14 receives 190 nm wavelength light and the other part receives light of other wavelengths. In the conventional spectroscope, the wavelength discrepancy reaches larger than 10 nm in the area covered by the spectroscope.

In the spectroscope of the present embodiment, as shown in FIGS. 3A–3C, curving of a monochromatic spectrum component is minimized, and the monochromatic spectrum component is almost linear along x-axis. The wavelength discrepancy in the same area as above is less than 2 nm, i.e., less than ⅕ compared to the conventional spectroscope.

In the above embodiment, the first concave mirror 2 also has a toroidal surface, as well as the collimator mirror 4. However, for the first concave mirror 2 at least, it is not necessary to be toroidal, but it is possible to have another surface shape. The spectroscope described above is a crossed-type Czerny-Turner spectroscope, but it is not critical to use that type of spectroscope to embody the present invention. It is also possible to apply the present invention to other types of Czerny-Turner spectroscope in which the incident beam and the reflected beam of the diffraction grating do not cross. The application of the present invention to an ultraviolet and visible spectrophotometer described above is a mere example; the present invention is applicable to any spectroscope or spectrophotometer that requires high wavelength accuracy.

What is claimed is:

1. A Czerny-Turner spectroscope comprising:
   a collimator mirror having a toroidal surface for reflecting a beam of light passing through an entrance slit to a plane diffraction grating; and
   a telemeter mirror having a cylindrical surface for reflecting and converging the beam of light reflected and separated by the plane diffraction grating to an exit.

2. The Czerny-Turner spectroscope according to claim 1, wherein a linear spectrum restrictor is placed at the exit, and a straight generatrix of the cylindrical surface of the telemeter mirror is set to lie substantially parallel to the linear spectrum restrictor.

3. The Czerny-Turner spectroscope according to claim 1, wherein a concave mirror is provided between the entrance slit and the collimator mirror, and the concave mirror has a toroidal surface.

4. The Czerny-Turner spectroscope according to claim 1, wherein a concave mirror is provided between the entrance slit and the collimator mirror, and the concave mirror has a spherical surface.

5. The Czerny-Turner spectroscope according to claim 1, wherein the Czerny-Turner spectroscope is a crossed type in which the incident beam and the reflected beam of the diffraction grating cross.

6. The Czerny-Turner spectroscope according to claim 1, wherein the incident beam and the reflected beam of the diffraction grating do not cross.

7. A detector for a capillary electrophoresis microchip using a Czerny-Turner configuration and comprising:

a collimator mirror having a toroidal surface for reflecting a beam of light passing through an entrance slit to a plane diffraction grating; and a telemeter mirror having a cylindrical surface for reflecting and converging the beam of light reflected and separated by the plane diffraction grating to a separation channel of the capillary electrophoresis microchip.

8. The detector according to claim 7, wherein a straight generatrix of the cylindrical surface of the telemeter mirror is set to lie substantially parallel to a length of a separation channel of the capillary electrophoresis microchip.

* * * * *